Patented Aug. 25, 1931

1,820,023

UNITED STATES PATENT OFFICE

GEORG KALISCHER, OF FRANKFORT-ON-THE-MAIN, AND ERNST HONOLD, OF FRANK-FORT-ON-THE-MAIN-FECHENHEIM, GERMANY, ASSIGNORS TO GENERAL ANILINE WORKS, INC., OF NEW YORK, N. Y., A CORPORATION OF DELAWARE

ACID WOOL DYESTUFFS OF THE ANTHRAQUINONE SERIES AND A PROCESS OF MAKING SAME

No Drawing. Application filed January 29, 1929, Serial No. 336,000, and in Germany February 1, 1928.

The present invention relates to acid wool dyestuffs of the anthraquinone series and to a process of making the same.

We have found that acid wool dyestuffs of a very good fastness are obtained by connecting an amino-anthraquinone nucleus containing auxochromic groups with the methylene group of a benzyl residue by means of a sulfur bridge and introducing sulfonic groups at least into the said benzyl residue. The new dyestuffs correspond to the general formula

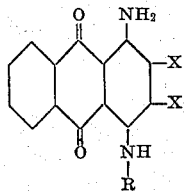

The connection of the amino-anthraquinone and the benzyl residue by means of a sulfur atom may be effected by condensing a benzyl mercaptan with a halogen amino-anthraquinone compound or by condensing a benzyl-halide with an amino-anthraquinone mercaptan compound. The introduction of the sulfonic acid group into the benzyl residue may be carried out before or after forming the thio-ether bond. It generally already occurs at a low temperature, when using concentrated sulfuric acid. When a benzyl-amino-anthraquinonyl-thioether compound is sulfonated, the anthraquinone residue of which contains other easily sulfonizable residues besides the thiobenzyl-group, di- or poly-sulfonic acids can be obtained, which acids are sometimes of a special value, owing to their higher solubility.

The new dyestuffs obtained according to our present process dye different shades varying from yellowish red to greenish blue according to the auxochromic groups present in their molecule. The presence of a sulfonic group in the benzyl residue has an especially favorable influence on the levelling property of the dyestuffs.

In order to further illustrate our invention, the following examples are given, the parts being by weight and all temperatures in centigrade degrees. We wish it however to be understood that we are not limited to the particular products nor reaction conditions mentioned therein.

Example 1

30 parts of 1.4-diamino-2-mercapto-3-chloro-anthraquinone are dissolved in 150 parts of alcohol and 12 parts of a caustic soda solution of 40° Bé. To this solution 15 parts of benzyl-chloride are added. After a short time the new 1.4-diamino-3-chloro-anthraquinone-2-benzylsulfide separates in a crystallized form. It melts at about 208° and corresponds to the formula

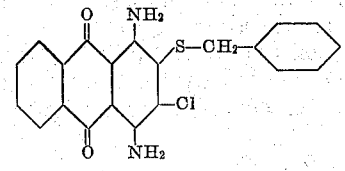

10 parts of this sulfide are dissolved in 80 parts of sulfuric acid monohydrate and the solution is gradually warmed to 60–70°, while stirring. After about 3 hours the mass is poured on ice and the separation of the dyestuff is completed by the addition of common salt. The new dyestuff corresponds probably to the formula

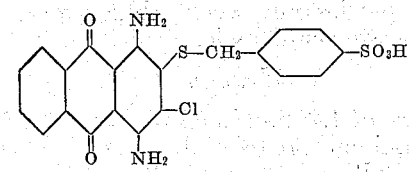

It dissolves in water to a bluish violet solution and dyes wool from an acid bath well levelling, bluish violet shades of an excellent fastness. Its solution in sulfuric acid is nearly colorless and becomes dark blue after the addition of paraformaldehyde.

Example 2

A solution of 27.5 parts of the sodium salt of benzyl-chloride-para-sulfonic acid in 100 parts of water is allowed to run into a solution of 30 parts of the sodium salt of 1.4-diamino-2-mercapto-3 - chloro - anthraquinone in 300 parts of water. The mass is stirred at 60° for about 3 hours. Then the dyestuff is precipitated by the addition of common salt. It is identical with that described in Example 1.

*Example 3*

40 parts of 1.4-diamino-3-chloro-anthraquinone-2-benzylsulfide described in Example 1 are suspended in 200 parts of alcohol. To this suspension a solution of 50 parts of crystallized sodium sulfide and 7 parts of sulfur in 200 parts of water is added and the whole is boiled for some hours. Then the alcohol is distilled off and the sodium salt of 1.4-diamino-3-mercapto-anthraquinone - 2 -benzylsulfide is isolated by the addition of common salt. This sodium mercaptide is again dissolved in alcohol and condensed with 15 parts of benzyl-chloride. After a short time 1.4-diamino-anthraquinone-2.3-di-benzylsulfide separates. It melts at about 197° and corresponds to the formula

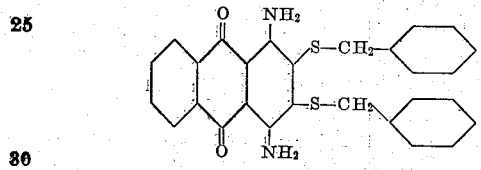

30 parts of this disulfide are dissolved in 400 parts of sulfuric acid monohydrate and the solution is maintained at 70° for some hours. Then the mass is poured on ice and the new dyestuff is isolated by the addition of common salt. It corresponds probably to the formula

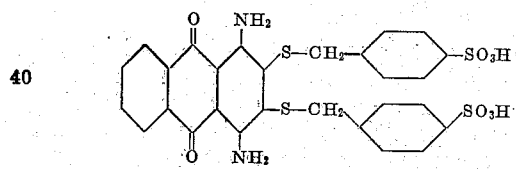

It dissolves in water to a blue solution and dyes wool dark blue shades of an excellent fastness. Its solution in sulfuric acid is nearly colorless and becomes blue when mixed with paraformaldehyde.

*Example 4*

8 parts of 1.4-diamino-2-phenoxy-3-chloro-anthraquinone are treated in an alcoholic suspension with a sodium disulfide solution and the sodium mercaptide, thus obtained, is condensed with benzyl-chloride in the manner described in Example 3. Thereby 1.4-diamino-2-phenoxy-anthraquinone-3-benzyl sulfide melting at about 224° and corresponding to the formula

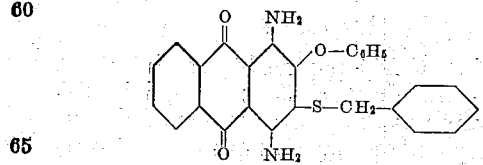

is formed. 10 parts of this compound are dissolved in 80 parts of sulfuric acid monohydrate and the solution is maintained at 40° for 2 hours, while stirring. The new dyestuff is isolated as described in the foregoing examples. It corresponds probably to the formula

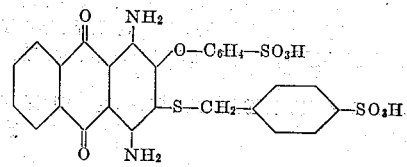

Its solution in sulfuric acid is feebly red and becomes blue, when mixed with paraformaldehyde. The dyestuff dissolves in water to a violet solution and dyes wool fast, violet shades.

*Example 5*

16 parts of 1-amino-2-mercapto-4-paratolyl-amino-anthraquinone are condensed with benzylchloride as described above. 1-amino-4-para-tolyl-amino - anthraquinone-2-benzylsulfide, thus obtained, melts at about 179° and corresponds to the formula

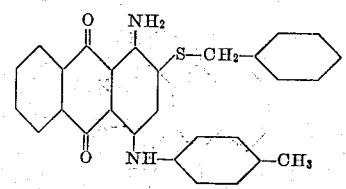

20 parts of this compound are dissolved in 100 parts of sulfuric acid monohydrate and the solution is heated to 80° for some hours. The new dyestuff is worked up as described in Example 1. It corresponds probably to the formula

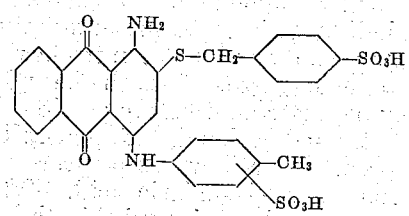

It dissolves in sulfuric acid to a violet solution turning blue on the addition of paraformaldehyde. The dyestuff dyes wool greenish blue-grey shades.

When 1-amino-2-mercapto-4-para-tolyl-amino-anthraquinone is replaced by the corresponding phenyl-amino compound and the process is otherwise carried out in a like manner, a dyestuff is obtained which has nearly the same properties and an analogous constitution.

*Example 6*

A solution of 27.5 parts of the sodium salt of benzyl-chloride-parasulfonic acid in 80 parts of water is allowed to run into a solution of 30 parts of the sodium salt of 1-amino-2-mercapto-4-para-tolyl-amino-anthraquinone in 300 parts of water. The mixture is stirred at 60° for about 3 hours. Then the new dyestuff is isolated as described above. It corresponds to the formula

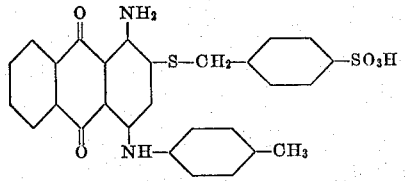

It dissolves in sulfuric acid to a violet solution and dyes wool bluish grey shades. By further sulfonating this mono-sulfonic acid a dyestuff probably identical to that of Example 5 is obtained.

*Example 7*

1-amino-2.4-dibromo-anthraquinone is condensed with cyclohexyl-amine. The formed 1-amino-2-bromo-4-cyclohexyl-amino-anthraquinone is treated with sodium polysulfide to prepare 1-amino-2-mercapto-4-cyclohexylamino-anthraquinone. This mercaptan is allowed to react with benzyl chloride and the 1-amino-4-cyclohexylamino-anthraquinone-2-benzyl-sulfide melting at about 199°, thus obtained, is sulfonated in the manner described above. Thereby a new dyestuff is produced which dyes wool bright blue shades. It corresponds to the formula

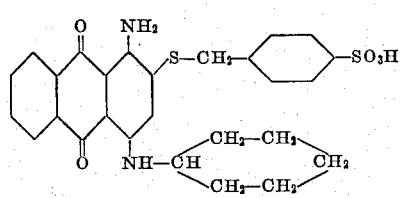

It dissolves in sulfuric acid to a yellowish brown solution.

We claim:

1. A process for the manufacture of anthraquinone thioethers which comprises condensing an anthraquinone mercaptan corresponding to the general formula:

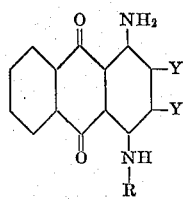

wherein R stands for hydrogen or an aryl or cycloalkyl group, one Y stands for hydrogen, halogen or an ether or thioether group and the other Y for SH, with a benzyl halide, and sulfonating the product thus obtained.

2. A process for the manufacture of anthraquinone thioethers which comprises condensing an anthraquinone mercaptan corresponding to the general formula:

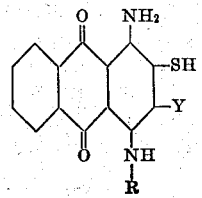

wherein R stands for hydrogen or an aryl or cycloalkyl group and Y stands for hydrogen, halogen and ether or thioether group, with a benzyl halide, and sulfonating the product thus obtained.

3. A process for the manufacture of a di-amino-anthraquinone thioether which comprises condensing 1.4-di-amino-2-mercapto-3-chloro-anthraquinone with benzyl chloride, and treating the product thus obtained with sulfuric acid monohydrate.

4. As new products acid wool dyestuffs corresponding to the probable general formula:

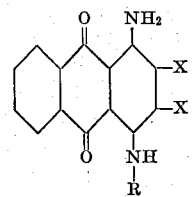

wherein R stands for hydrogen or an aryl or cycloalkyl group, one X stands for the group —S—CH$_2$—C$_6$H$_4$—SO$_3$H and the other X for hydrogen, halogen or an ether or thioether group, which products are yellowish-blue powders, soluble in water, dyeing wool from an acid bath fast yellowish-red to greenish-blue shades and showing an excellent levelling property.

5. As new products acid wool dyestuffs corresponding to the probable general formula:

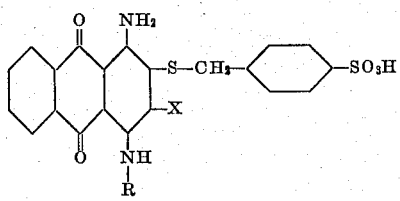

wherein R stands for hydrogen or an aryl or cycloalkyl group, and X stands for hydrogen, halogen or an ether or thioether group, which products are yellowish-blue powders, soluble in water, dyeing wool from an acid bath fast yellowish-red to greenish-blue shades and showing an excellent levelling property.

6. As a new product the acid wool dyestuff of the probable formula

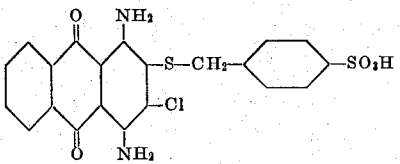

which product is a bluish violet powder, soluble in sulfuric acid to a nearly colorless solution becoming dark blue on the addition of para-formaldehyde, soluble in water to a bluish violet solution, dyeing wool from an acid bath fast bluish violet shades and showing an excellent levelling property.

In testimony whereof, we affix our signatures.

GEORG KALISCHER.
ERNST HONOLD.

Certificate of Correction

Patent No. 1,820,023.                                      Granted August 25, 1931, to

GEORG KALISCHER ET AL.

It is hereby certified that error appears in the printed specification of the above-numbered patent requiring correction as follows: Page 1, immediately following the formula between lines 13 and 20, insert the expression *wherein R stands for hydrogen or an aryl or cycloalkyl group, one X stands for the group* $-S-CH_2-C_6H_4-SO_3H$ *and the other X for hydrogen, halogen or an ether or thioether group;* and that the said Letters Patent should be read with this correction therein that the same may conform to the record of the case in the Patent Office.

Signed and sealed this 24th day of November, A. D. 1931.

[SEAL.]                                                                 M. J. MOORE,
*Acting Commissioner of Patents.*